United States Patent
Webb et al.

(10) Patent No.: US 8,355,128 B2
(45) Date of Patent: Jan. 15, 2013

(54) POLARIZATION CONTROLLER

(75) Inventors: Stephen Michael Webb, Gravesend (GB); John F Ellison, Ipswich (GB)

(73) Assignee: Xtera Communications Inc., Allen, TX (US)

(*) Notice: Subject to any disclaimer, the term of this patent is extended or adjusted under 35 U.S.C. 154(b) by 296 days.

(21) Appl. No.: 12/814,275

(22) Filed: Jun. 11, 2010

(65) Prior Publication Data

US 2010/0315640 A1  Dec. 16, 2010

(51) Int. Cl.
*G01J 4/00* (2006.01)
(52) U.S. Cl. ...................................... 356/364
(58) Field of Classification Search .................. None
See application file for complete search history.

(56) References Cited

U.S. PATENT DOCUMENTS

| | | | |
|---|---|---|---|
| 6,576,886 B1* | 6/2003 | Yao | 250/225 |
| 7,725,026 B2* | 5/2010 | Patel et al. | 398/16 |
| 2003/0086144 A1 | 5/2003 | Chou et al. | |
| 2005/0162741 A1 | 7/2005 | Sone et al. | |
| 2005/0199787 A1* | 9/2005 | Zhang et al. | 250/225 |

FOREIGN PATENT DOCUMENTS

| | | |
|---|---|---|
| WO | 03050984 A | 6/2003 |
| WO | WO2004083945 A1 | 9/2004 |

OTHER PUBLICATIONS

R. M. Murray, Z. Li and S. S Sastry, "A Mathematical Introduction to Robotic Manipulation", CRC Press, 1994 (474 pages).
Martinelli, M. and Chipman, R.A., "Endless Polarization Control Algorithm Using Adjustable Linear Retarders With Fixed Axes", Journal of Lightwave Technology, vol. 21, No. 9, Sep. 2003, pp. 2089-2096.
J C Lagarias, J A Reeds, M H Wright, and P E Wright, "Convergence properties of the Nelder-Mead simplex method in low dimensions", SIAM Optim, vol. 9, No. 1 pp. 112-147, 1998.
PCT/GB2010/01154, Notifications of transmittal of the ISR and the Written Opinion of the ISA, or Declaration dated Dec. 12, 2011.

* cited by examiner

*Primary Examiner* — Tu Nguyen
(74) *Attorney, Agent, or Firm* — Workman Nydegger

(57) ABSTRACT

A feedforward controller for controlling the polarization state of an optical signal. The feedforward controller includes an optical input for receiving an optical input signal having an input polarization state, an optical output for transmitting an optical output signal having an output polarization state, a polarization controller coupled to the optical input and the optical output, and a transfer function determiner for determining a characteristic polarization transfer function of the feedforward controller from the input and output polarization states. The polarization controller is adapted to modify the polarization state of light passing therethrough in dependence on the characteristic polarization transfer function of the feedforward controller.

25 Claims, 8 Drawing Sheets

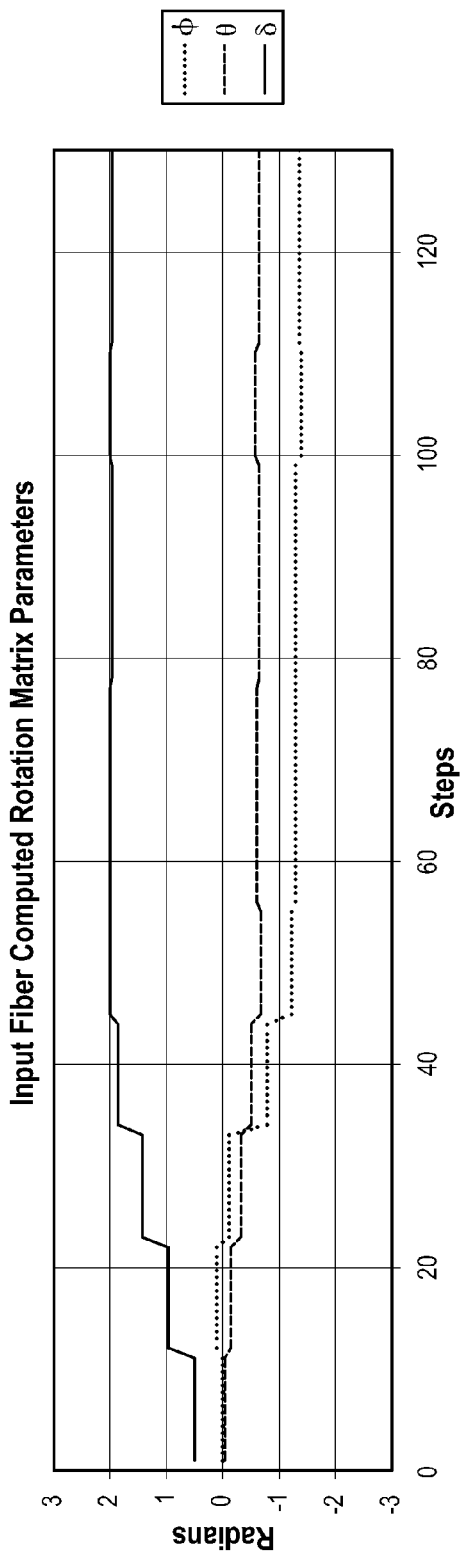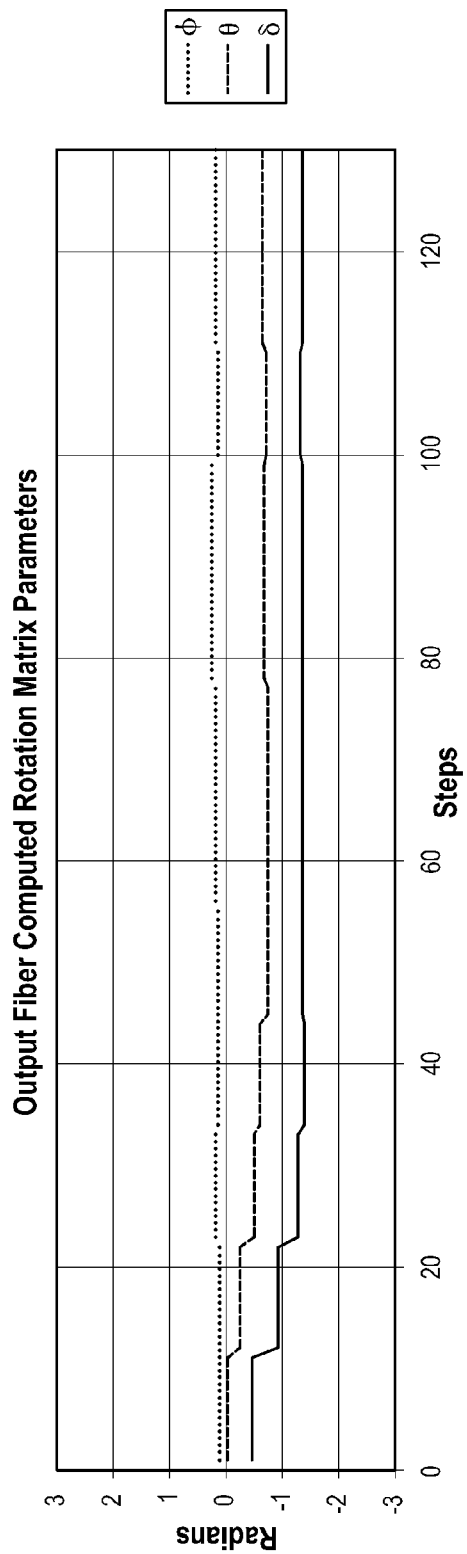

POLARIZATION CONTROLLER

CROSS-REFERENCE TO RELATED APPLICATIONS

This application claims the benefit under 35 U.S.C. 119 to United Kingdom patent application serial number 0910204.7 filed Jun. 12, 2009, and entitled "A DETERMINISTIC FEEDFORWARD POLARIZATION CONTROLLER", which United Kingdom patent application is incorporated herein by reference in its entirety.

BACKGROUND

A common requirement in optical systems is the ability to control or stabilize the polarization state of light in an optical fiber. An example of this application would be the field of coherent optical communication systems, in which a local oscillator laser is mixed with the incoming signal light. The resulting difference signal carrying the information is at a maximum when the local oscillator and signal lasers are aligned in polarization at the receiver, and complete loss of signal is possible if these two lasers are significantly misaligned.

Conventionally, the solution to controlling the polarization state of light travelling in optical fiber is through the use of a polarization controller containing a number of polarization active elements which transform the polarization state in specific ways depending on the applied force acting on each element. For example, a lithium niobate based controller possesses a number of stages the birefringence of which may be influenced through the application of an electric field. An alternative known scheme exploits the sensitivity of high birefringence fiber to an external pressure which is generated from a piezoelectric element.

Common amongst most of these schemes is the difficulty in obtaining a precise and deterministic polarization transformation. For instance, lithium niobate suffers from bias drift with temperature, while high birefringence fiber has a very strong sensitivity to both temperature and pressure. Even when these variables are compensated for, the polarization controller itself will have fiber tails in order to integrate it with the other components in the system, and these tails themselves will have an unknown and variable effect on the polarization state of light entering and exiting the device.

For these reasons conventional polarization control relies on a feedback technique, whereby some parameter correlating to the desired output state is used in a control loop to iteratively adjust the polarization controller for the desired transmitted output state. An example of a strong feedback parameter device would be a polarizer. The output of the polarizer is maximized (or minimized) through iterative and continuous adjustment of the controlling elements of the polarization controller. A disadvantage of this technique is the lack of agility with which the system can respond to changes in the input state of polarization. Since the polarization transfer function of the fiber tails is unknown, every change in input polarization state requires an iterative adjustment to the controller elements to rediscover the best configuration of the elements within the polarization controller. This can be slow.

It is known that the state of polarization at the input of a conventional polarization controller of the type described hereinabove can vary arbitrarily and rapidly. Since conventional polarization control can be slow this is not well adapted to such a rapidly changing situation.

BRIEF SUMMARY

According to a first aspect of the present invention there is provided a feedforward controller for controlling the polarization state of an optical signal, the feedforward controller comprising: an optical input for receiving an optical input signal having an input polarization state; an optical output for transmitting an optical output signal having an output polarization state; a polarization controller coupled to the optical input and the optical output; a transfer function determiner for determining a characteristic polarization transfer function of the feedforward controller from the input and output polarization states; wherein the polarization controller is adapted to modify the polarization state of light passing therethrough in dependence on the characteristic polarization transfer function of the feedforward controller. In accordance with this aspect, it possible to modify the polarization state of light passing through the feedforward controller without the need to use a fast iterative process.

This aspect allows a characteristic polarizer transfer function of the feedforward controller to be determined even when the feedforward controller includes components such as optical fibers in the form for example fiber tails, which themselves will have an unknown polarizer transfer function.

The transfer function determiner may comprise an input sampler for sampling the optical input signal to provide one or more signals representative of the polarization state of the optical input signal; an output sampler for sampling the optical output signal to provide one or more signals representative of the polarization state of the optical output signal, the feedforward controller further comprising a signal processor coupled to the optical input and output samplers and adapted to process the representative signals received therefrom to generate one or more control signals, wherein the polarization controller is adapted to modify the polarization state of light passing therethrough in dependence on the one or more control signals received from the signal processor.

The polarization controller may be adapted to modify the polarization state of light passing therethrough to maintain a given polarization state of the optical output signal. In this way, once a particular output polarization state has been transmitted, the feedforward controller can dynamically react to small changes in polarization behavior so as to maintain that original polarization state.

At least one of the input and output samplers may comprise an optical coupler for sampling the optical signal, and a polarimeter coupled to the optical coupler and adapted to provide one or more signals representative of the polarization state of the optical signal. The optical coupler may comprise a tap coupler.

The polarimeter may comprise a resolver for resolving one or more polarization components of the optical signal, and one or more respective photodiodes for measuring the magnitude of the one or more polarization components resolved. Such resolver means may comprise a combination of waveplates and/or polarizer elements. In some embodiments, the resolver is adapted to resolve at least three polarization components of the optical signal. The polarization components may then define a Stokes vector for the optical signal.

The polarization controller may comprise one or more optical elements, and may for example comprise a plurality of waveplates, each waveplate having an electrically controllable retardance. In one embodiment the polarization controller comprises four waveplates having their fast axes oriented at 0, +45, 0, −45 degrees, respectively, although other arrangements are possible.

Typically, the signal processor will be a digital signal processor, in which case the feedforward controller further comprises a first analog-to-digital converter for converting analog signals received from the optical input sampling means into digital signals for the digital signal processor, a second analog-to-digital converter for converting analog signals received from the optical output sampling means into digital signals for the digital signal processor, and a digital-to-analog converter for converting digital signals from the digital signal processor into analog signals for driving the polarization controller.

When used in a repolarizing mode of operation, the feedforward controller may further comprise: a polarizing component coupled to the optical output for transmitting light of a predetermined polarization state; and a monitor for monitoring at least one of an amount of light transmitted by the polarizing component and an amount of light rejected by the polarizing component and to generate a representative signal therefor, wherein the monitor is coupled to the signal processor and the signal processor is further adapted to process the representative signal received therefrom to generate the one or more control signals for the polarization controller, whereby the polarization controller is adapted to modify the polarization state of light passing therethrough such that the amount of light transmitted by the polarizing component is maximized and the amount of light rejected by the polarizing component is minimized.

In an embodiment of the invention, the polarizing component comprises a polarizing beamsplitter and the monitor comprises a photodiode for monitoring the amount of light rejected by the polarizing beamsplitter. In this way, the system can correct for variations in polarization behavior and also ensure that the final optical output beam has a defined polarization state and contains as much of the original light energy as possible.

According to a second aspect of the present invention a feedforward controlled optical fiber system comprises: a feedforward controller according to the first aspect; a first optical fiber transmitting the optical input signal and coupled to the input sampler and to the polarization controller; and, a second optical fiber transmitting the optical output signal and coupled to the polarization controller and to the output sampler.

Typically, the first and second optical fibers are optically coupled to the polarization controller by respective fiber tails. Embodiments described herein are particularly applicable to optical fiber based systems, which are coupled by fiber tails having unknown and difficult to quantify polarization characteristics. The feedforward controller is able to compensate for such elements without knowing the absolute polarization state of the optical input.

The optical fiber system may be part of an overall optical communications system, such as a polarization multiplexing optical fiber communications system which multiplexes two or more optical signals having different polarization states. In this case the signal processor of the feedforward controller is adapted to generate the one or more control signals for the polarization controller, whereby the polarization controller is adapted to modify the polarization state of light passing therethrough such that the polarization states of the two or more optical signals maintain their original orientations and the original data bearing signals can be recovered.

The optical fiber system may form part of a polarization mode dispersion (PMD) compensator.

According to a third aspect of the present invention there is provided a method for controlling the polarization state of an optical signal, the method comprising the steps of: receiving an optical input signal at the input to an optical system; generating one or more signals representative of the polarization state of the optical input signal; transmitting the optical input signal through the optical system; generating one or more signals representative of the polarization state of an optical output signal from the optical system; processing the signals representative of the input and output polarization states to compute a characteristic polarization transfer function of the optical system; modifying the polarization state of light passing therethrough in dependence on the characteristic polarization transfer function.

The method may comprise the further steps of generating one or more control signals for driving a polarization controller forming part of the optical system; and modifying the polarization state of light passing through the polarization controller in response to the one or more control signals.

The steps may be performed continuously in order to drive the polarization controller so as to maintain a polarization state of the optical output signal.

The step of generating one or more signals representative of the polarization state of the optical input signal may comprise resolving the optical input signal into one or more components having different polarization, and measuring the relative strength of these components. The optical input signal may be resolved into at least three different polarization components. The polarization components may define a Stokes vector for the optical signal.

In some embodiments, driving the polarization controller comprises adjusting the optical retardation of a birefringent optical component.

When used in a repolarizing application, the method may further comprise the steps of: generating a signal representative of the magnitude of a polarization component of the optical output signal; processing the representative signal; and, generating the one or more control signals for driving the polarization controller to modify the polarization state of light passing therethrough so as to maximize or minimize the magnitude of the polarization component of the optical output signal.

For some applications, the polarization controller may be driven so as to rotate the polarization state of the output light by a predetermined angle. This is particularly useful when it is necessary to compensate for a known polarization rotation in another part of an optical system.

Conventional polarization tracking schemes are hindered by the use of a feedback technique which iteratively adjusts the polarization controller to obtain the desired output polarization state, resulting in slow convergence and response speed. The present invention addresses this problem by using a feedforward technique to compute the required configuration of the polarization controller which will generate the desired output state, resulting in a single step convergence to the solution.

In this aspect, a polarization controller may be controlled in a manner which significantly reduces the number of iterative steps required to achieve the desired output polarization state. The principle is essentially a feedforward technique whereby the required configuration of the polarization controller is computed in real time from a knowledge of a relative polarization state at some point in the system before the controller and a relative polarization state at some point in the system after the controller. The technique does not require absolute states of polarization to be known, since this is impossible in a system where optical fibers are present and are hiding the actual polarization state at the output of the controller.

In one aspect, an intelligent algorithm is employed which learns the unknown transfer functions of components in the system, such as fiber tails, and automatically compensates for the polarization rotations produced by these tails. Over time, as the algorithm gains more accurate knowledge of the system, any input polarization change monitored by the polarization analyzer before the controller can be compensated for in one step, resulting in minimal polarization state change at the output.

The main steps of the algorithm can be summarized as follows:

1) Accumulation of a number of pairs of input and output polarization state measurements using suitable devices, such as polarimeters. The polarization states can be collected through natural polarization drift in the system or by deliberate polarization scrambling and through different settings of the polarization controller itself.

2) Computation of the rotation transfer matrices characterizing the behavior of the unknown components in the system using the collected polarization state pair measurements and the known transfer matrix of the polarization controller for each pair of measurements. This step can be executed using any number of a variety of numerical or analytical methods, such as the Nelder Mead method.

3) Computation of the polarization controller transfer matrix required to restore the output polarization to the desired state, based on the transfer matrices computed at step 2. The polarization controller elements are then set to achieve this required transfer matrix.

The feedforward controller implements a slow loop which determines what the desired output state should be, for example by dithering the polarization controller to maximize or minimize transmission through a polarization beamsplitter.

In short the algorithm is a "learning" algorithm, which determines unknown rotation matrices in the system allowing them to be compensated for. It is also adaptive in the sense that it can track any changes in the rotation matrices which characterize system components (e.g. optical fibers), as they drift over time.

By way of an example, in the case of an optical fiber based system where the fibers are connected to the polarization controller by fiber tails, the algorithm would consist of the following parts:

1) A learning element which discovers the fiber transfer functions of the input and output fiber tails of the polarization controller from random input state fluctuations.

2) A feedforward element which computes the required configuration of the polarization controller based on the polarization states measured at some point in the system before and after the controller, and the learnt fiber transfer functions from (1) above.

3) A tracking element which continuously corrects the learnt transfer function in (1) by applying small dithers to the polarization controller.

As indicated above, the learning process can be speeded up by employing a scrambler located before the polarization controller to deliberately explore a number of polarization states.

As will be appreciated by those skilled in the art, the present invention provides a powerful technique for controlling the polarization state of optical signals in systems, which include components having unknown polarization characteristics. Moreover, it is possible to dynamically compensate for polarization changes at the same time, and the learning algorithm can be employed with a wide range of polarization controllers. The principles described herein have wide application, and is particularly useful in optical fiber communication systems.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIGS. 7 to 10 illustrate graphically the results from a numerical simulation of a feedforward polarization control system according to an embodiment of the invention.

DETAILED DESCRIPTION

Figure 1:
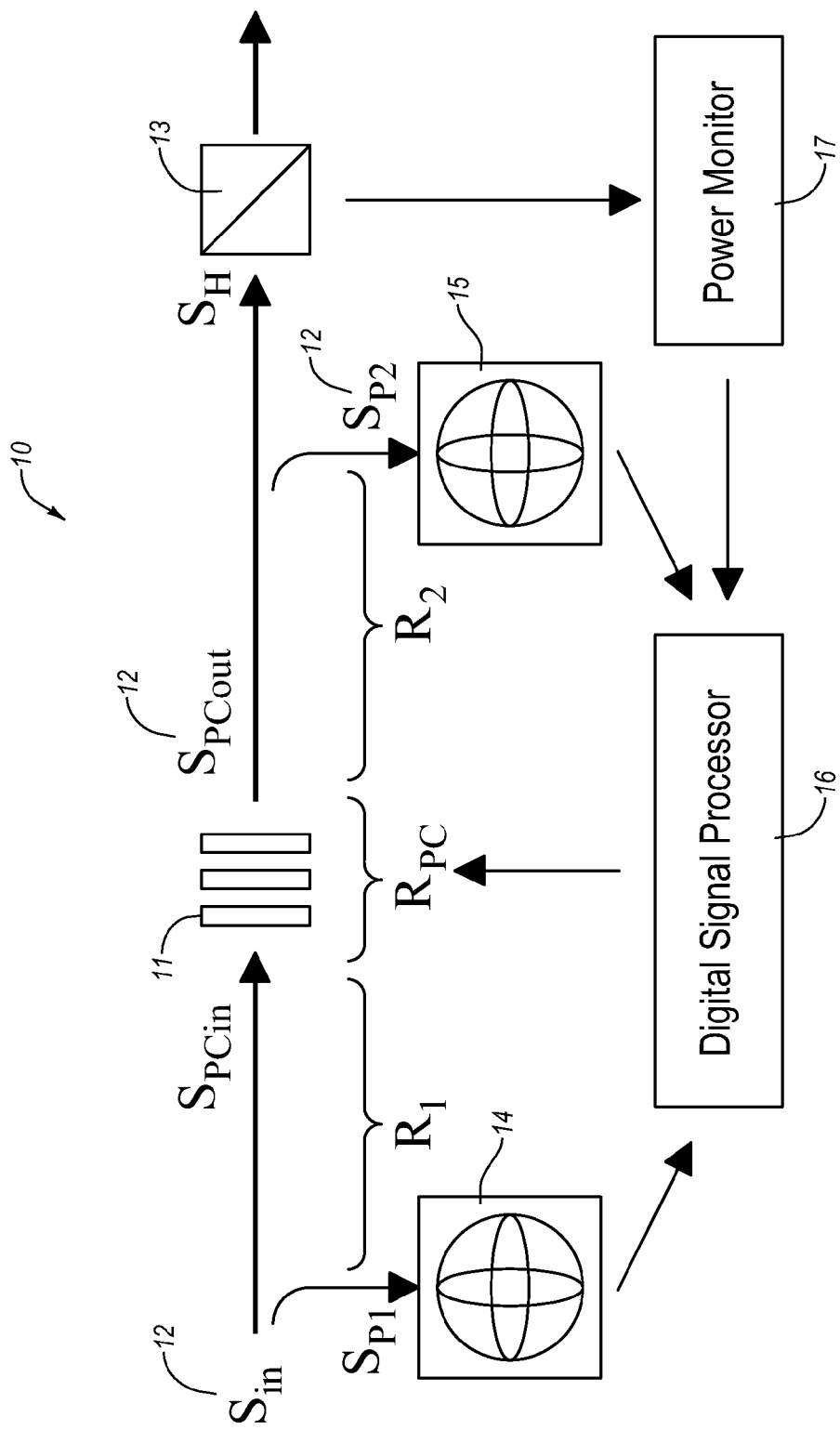
FIG. 1 shows a feedforward polarization control system according to an embodiment of the invention.

FIG. 1 illustrates an embodiment of the invention in the context of a "repolarizing" mode of operation. The figure shows primary elements of a feedforward polarization controller 10 according to the invention, which is based around a polarization controller device 11. Also indicated in FIG. 1 is the polarization state 12 of the light signal at various points in the system. The standard textbook "Optics" by E Hecht, (Addison Wesley, 2002) describes how the polarization states of light may be represented mathematically. In particular, polarization states may be represented by three element Stokes vectors (S) and polarization transformations are represented by 3×3 Mueller matrices (R), as follows:

$$S = \begin{bmatrix} s_1 \\ s_2 \\ s_3 \end{bmatrix}, R = \begin{bmatrix} r_{11} & r_{12} & r_{13} \\ r_{21} & r_{22} & r_{23} \\ r_{31} & r_{32} & r_{33} \end{bmatrix} \quad (1)$$

The input light, having a state of polarization $S_{in}$, undergoes a polarization transformation on passing through optical components, for example an input fiber tail (not shown), before impinging on the polarization controller (PC). The PC, consisting in this case of three waveplates, transforms the polarization state at its input, $S_{PCin}$, to the state $S_{PCout}$ at its output. This transformation is represented by the Mueller matrix $R_{PC}$. The output polarization state undergoes a further transformation on passing through other optical components, for example an output fiber tail (not shown), before impinging on the polarization beam splitter (PBS) 13 with polarization state $S_H$. The desired system state is for the polarization controller 11 to be configured such that there is maximum transmission through the transmit port of the PBS, i.e. $S_H$ is $[1\ 0\ 0]^T$ if the PBS admits horizontally polarized light and diverts vertically polarized light.

A conventional feedback controller would achieve the desired aim by dithering the elements of the polarization controller 11 in order to maximize transmission through the transmit port of the PBS 13, which is equivalent to minimizing transmission through the divert port of the PBS. In order to provide a mechanism to feedforward, the principles described herein build on this fundamental controller by adding two polarimeters, one 14 before the PC and one 15 after, as shown in FIG. 1, which provide signals to a digital signal processor 16 for processing and providing suitable control signals to the elements of the polarization controller 11.

The first polarimeter 14 measures a polarization state which is representative of, but not necessarily the same as, the actual polarization state impinging on the polarization controller 11. This measured state, $S_{P1}$, is related to $S_{PCin}$ by the Mueller transfer matrix, $R_1$, describing the polarization behavior of any optical components (e.g. an optical fiber and pigtail) between the polarimeter 14 and the polarization controller 11. The second polarimeter 15 measures a polarization state which is representative of the polarization state of the light exiting the polarization controller 11, and is related to $S_{PCout}$ by the Mueller transfer matrix, $R_2$, characterising the polarization behavior of any optical components (e.g. an optical fiber and pigtail) located between the polarization controller 11 and the second polarimeter 15. In Mueller matrix algebra we can write:

$$S_{P2}=R_2 R_{PC} R_1 S_{P1} \quad (2)$$

Provided the components (e.g. optical fiber) in the system have no polarization dependent loss, then $R_1$ and $R_2$ are pure rotation matrices and may be described using Rodrigues rotation matrix theory, as described in R. M. Murray, Z. Li and S. S Sastry, "A Mathematical Introduction to Robotic Manipulation", CRC Press, 1994. In this theory, each rotation matrix is expressed in terms of a principal axis about which the rotation is performed and the rotation angle itself. The Rodrigues rotation formula for a rotation matrix R can be expressed as follows:

$$R = I + r_x \sin\delta + r_x^2(1-\cos\delta) \quad (3)$$

where I is the identity matrix, $\delta$ is the rotation angle, and $r_x$ is a skew symmetric matrix representative of a vector product operator, and is given by:

$$r_x = \begin{bmatrix} 0 & -z & y \\ z & 0 & -x \\ -y & x & 0 \end{bmatrix} \quad (4)$$

with the vector $r=(x, y, z)^T$ being the rotation axis. Since the axis is a unit vector, it is conveniently expressed in spherical co-ordinates according to $$x = \cos\phi \sin\theta$$

$$y = \sin\phi \sin\theta$$

$$z = \cos\theta \quad (5)$$

Figure 2:
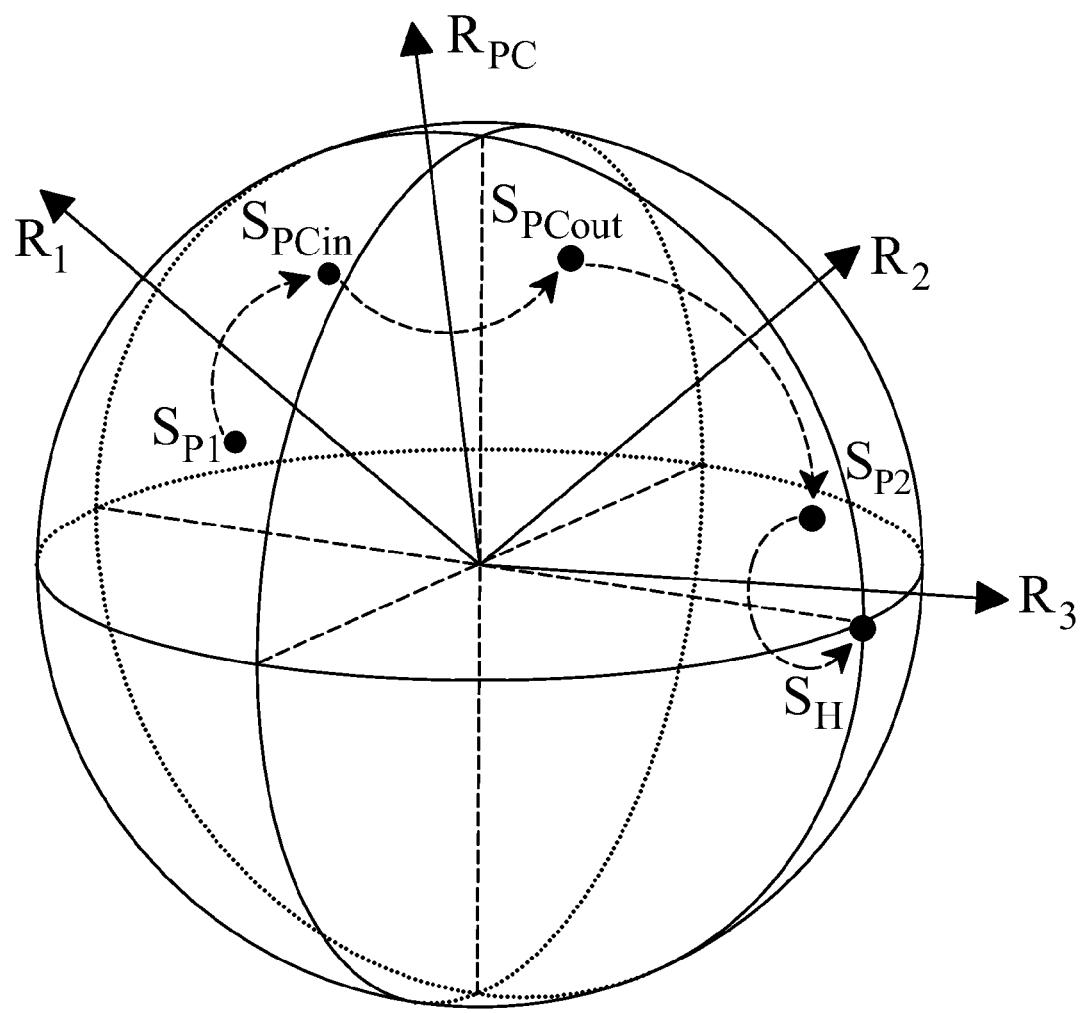
FIG. 2 illustrates the interrelationships between the polarization state vectors and transformation matrices on a Poincare sphere diagram.

The rotation matrix may therefore be described fully by three parameters, namely $R(\delta, \theta, \phi)$. The interrelationships between the polarization state vectors and transformation matrices described above (and indicated in FIG. 1) can be conveniently illustrated on a Poincare sphere diagram, as shown in FIG. 2.

The transfer matrix of the polarization controller, $R_{PC}$, is also a pure rotation matrix whose parameters may be calculated by Mueller matrix multiplication of the transfer functions of the waveplates within the polarizer, and is hence computable for those types of polarization controller where the waveplates can be set to a known retardance and/or orientation.

For example, consider the particular type of polarization controller consisting of two quarter-waveplates (QWP1 and QWP2) and one half-waveplate (HWP), arranged in the order QWP1:HWP:QWP2, with the fast axes of the two quarter-waveplates oriented $\pi/2$ apart. If QWP(x) represents a quarter-waveplate with fast axis at angle x and HWP(y) represents a half-waveplate with fast axis at angle (y), then the retarder combination QWP($\alpha/2$):HWP($\beta/2$):QWP($\alpha/2+\pi/2$) forms a polarization converter, which is always a half-wave retarder with eigenpolarizations on the Poincare sphere at Cartesian longitude $\alpha$ and latitude ($\beta-\alpha$), as described in Martinelli, M. and Chipman, R. A., "Endless Polarization Control Algorithm Using Adjustable Linear Retarders With Fixed Axes", Journal of Lightwave Technology, vol. 21, no. 9, Sep. 2003, pp. 2089-2096. The rotation matrix for this polarization converter may again be described using Rodrigue's formula, where the rotation angle in this case is $\pi$ (halfwave retarder) and the rotation axis is the Cartesian latitude and longitude.

Referring back to Equation (2), we can see that there are six unknowns, namely the three unknown parameters of $R_1(\delta_1, \theta_1, \phi_1)$ and the three unknown parameters of $R_2(\delta_2, \theta_2, \phi_2)$. By accumulating sufficient independent measurements of $S_{P1}$, $S_{P2}$ and $R_{PC}$, Equation (2) may be solved to obtain $R_1$ and $R_2$. Typically, the independent measurements will be accumulated through the natural drift of the input state of polarization and changes in the setting of the polarization controller. The solution may be obtained through the application of one of the appropriate common numerical methods for solving simultaneous equations. In particular, a modified Nelder Mead algorithm, such as the Dynamic Simplex method described in J C Lagarias, J A Reeds, M H Wright, and P E Wright, "Convergence properties of the Nelder-Mead simplex method in low dimensions", SIAM Optim, Vol. 9, No. 1 pp 112-147, 1998, is particularly suited to the task due to its good tolerance to measurement noise and the ability to dynamically evolve the solution in the presence of new measurement data.

Having solved Equation (2) for $R_1$ and $R_2$, it is now possible to set the polarization controller 11 to obtain any desired polarization state $S_{P2}$ from a given measured polarization state $S_{P1}$ by generating appropriate control signals to drive the polarization controller 11. The required $R_{PC}$, which gives the desired $S_{P2}$, may be obtained from the following relations:

$$S_{PCin}=R_1 S_{P1}$$

$$S_{PCout}=R_2^{-1} S_{P2}$$

$$S_{PCout}=R_{PC} S_{PCin} \quad (6)$$

This feedforward mechanism thus allows fast polarization stabilization to a desired value of $S_{P2}$ to be achieved in only a single iteration.

An important feature of feedforward polarization controller 10 is that it can be used to determine the value of $S_{P2}$, which is required to obtain maximum transmission through the PBS 13, i.e $S_H=[1\ 0\ 0]^T$. A power monitor 17 may be used to measure the power of the light exiting the PBS through its divert port and a conventional dither loop (via the digital signal processor 16) may be employed to optimize transmission through the PBS 13 by continuous small adjustment of the elements of the polarization controller 11. Once the transmission is optimized, the value of $S_{P2}$ becomes the reference polarization state which the feedforward polarization controller must generate. The dither loop may be continuously and independently run in the background to compensate for any slow changes in the fiber transfer matrices and ensure that the optimum values of $S_{P2}$, $R_1$ and $R_2$ are always available to the feedforward controller algorithm.

Figure 3:
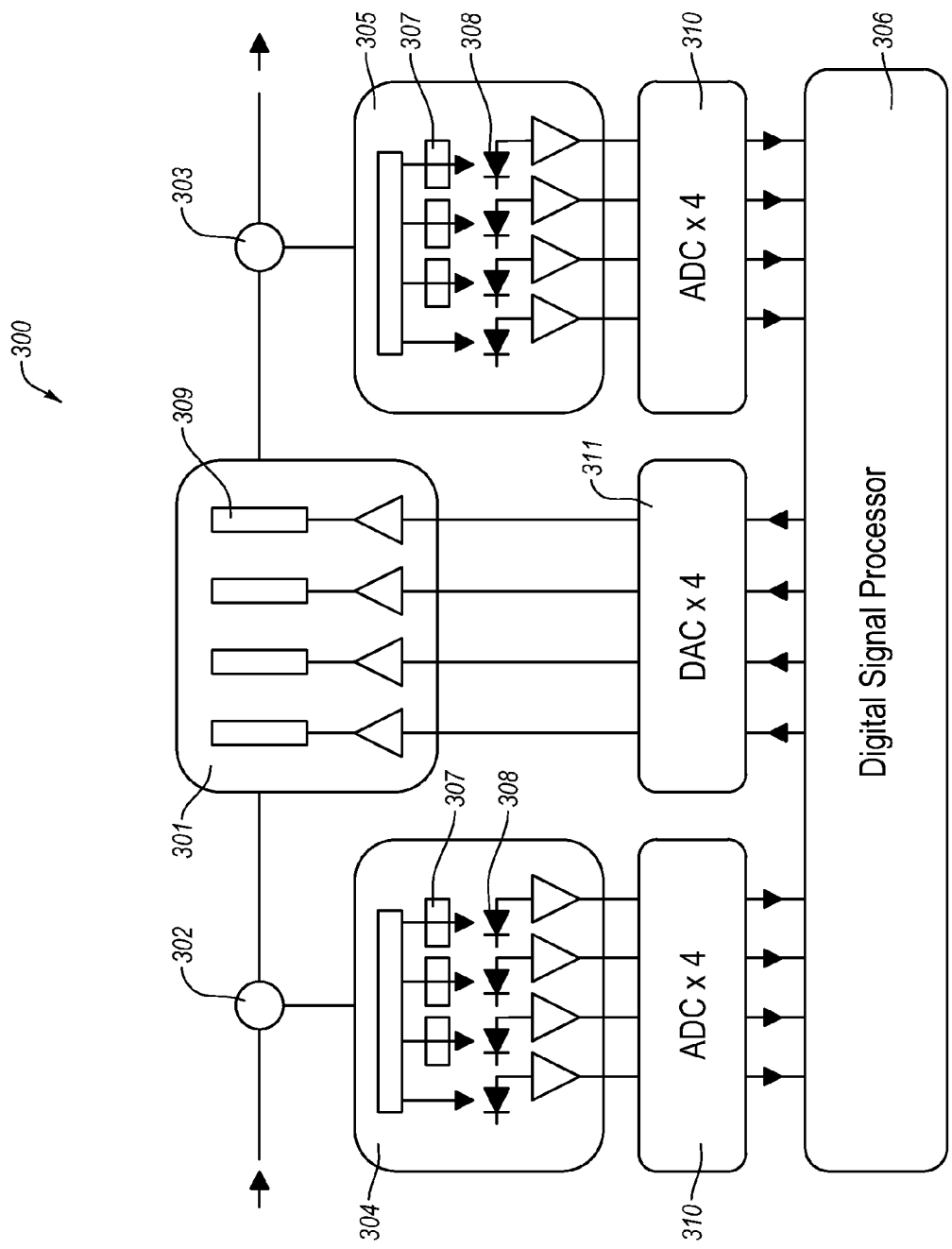
FIG. 3 shows a feedforward polarization stabilizer employing the polarization control system of FIG. 1.

FIG. 3 shows a feedforward polarization stabilizer system 300 according an embodiment described herein. The figure illustrates an example composition and operation of components of the system shown in FIG. 1, namely the input and output polarimeters, 304 and 305, the polarization controller 301, and the digital signal processor 306. Also shown are the tap couplers, 302 and 303, on the input and output of the polarization controller 301, which tap off a sample the optical signal at that point. Each of the two polarimeters, 304 and 305, typically comprises four photodiode detectors 308, together with a combination of waveplate and/or polarizer elements 307 positioned in front of each detector 308 to resolve particular components of the input polarization state.

The output signal from each of the four photodiodes 308 is amplified and processed to give the four Stokes parameters representing the polarization state of the input light {S0,S1, S2,S3}. In fact, in this four component Stokes vector representation, the polarization state of the beam is actually represented by S1, S2 and S3, since S0 represents the power of the optical beam. If the beam is perfectly polarized, then $S0^2 = S1^2 + S2^2 + S3^2$. Usually, however, the beam is partially depolarized, such that $S0^2 > S1^2 + S2^2 + S3^2$. The component S0 is of little importance, since achieving perfect alignment alters S1, S2 and S3, but not S0.

The polarization controller 301 applies a polarization transformation to the input light, which is equivalent to a rotation on the Poincare sphere. The transformation, or equivalently the rotation axis and magnitude, is determined by controls applied to the waveplates 309 located inside the polarization controller 301. As shown, a typical controller might consist of four variable retardance waveplates 309, with their axes oriented at 0, +45, 0, −45 degrees, respectively. Such a controller has a determinable transformation matrix.

It is to be understood however that the polarization controller may have any desired configuration having a determinable transfer matrix.

The digital signal processor 306 receives the information regarding the polarization state of the light entering and leaving the polarization controller 301 and provides suitable control signals to the elements of the polarization controller 301, after performing the necessary computations. Since the signals received from the polarimeter photodiodes 308 are generally analogue in nature, Analog-to-Digital converters (ADC) 310 are employed as appropriate in the interface with the digital signal processor 306. Likewise, as the control signals provided to the polarization controller 301 for controlling the polarization controller elements generally need to be analogue in nature, a Digital-to-Analog converter (DAC) 311 is employed as appropriate in the interface with the digital signal processor 306.

Figure 4:
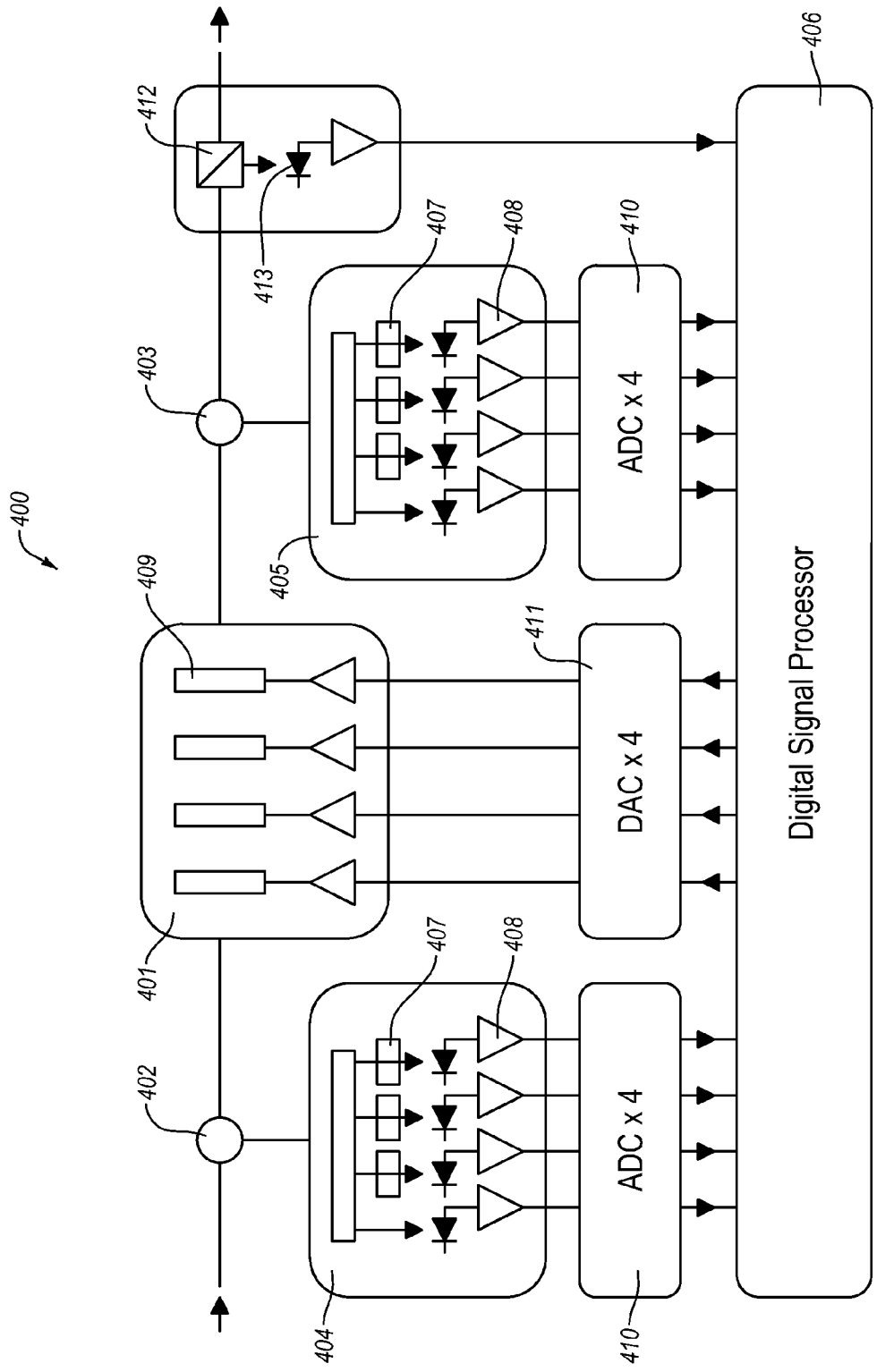
FIG. 4 shows a repolarizer employing the polarization control system of FIG. 3.

FIG. 4 shows the application of the principles described herein in a repolarizer mode of operation, whereby a state of polarization is restored. The repolarizer system 400 shown in FIG. 4 is identical to that shown in FIG. 3, apart from the addition of a polarization beam splitter 412 on the output stage in the manner illustrated in FIG. 1. The polarization beam splitter splits the light it receives into its horizontal and vertical polarization components, which exit the beam splitter via its two ports or arms. For example, if the vertical component is required to be transmitted, the output of the horizontal arm will be a minimum when the desired vertical output is at a maximum. A photodiode 413 is used to monitor the output of the horizontal arm and feed the signal to the digital signal processor 406, which operates to minimize this value by sending suitable control signals to the elements of the polarization controller 401.

Figure 5:
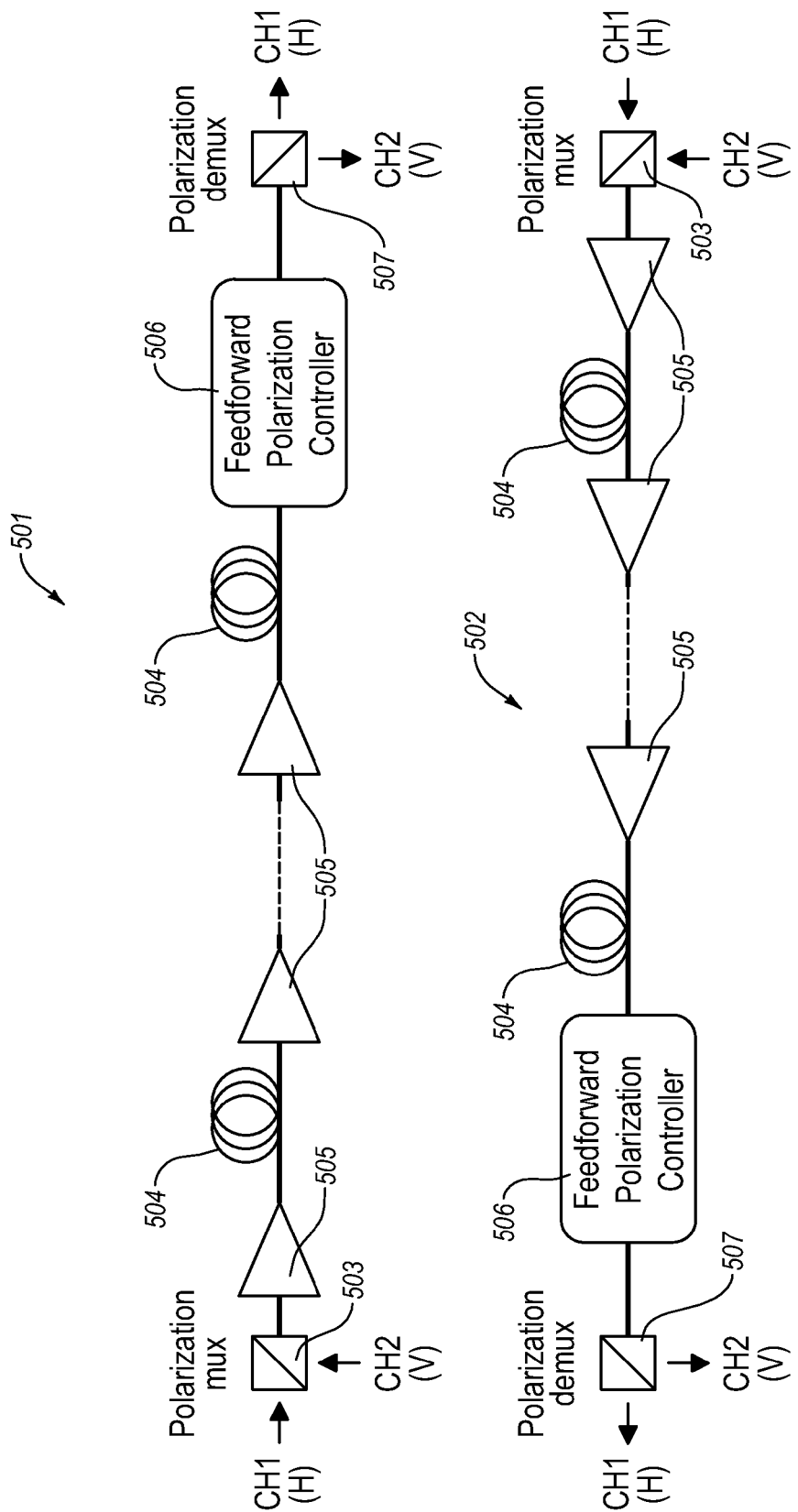
FIG. 5 shows a polarization multiplexed optical fiber communication system employing a polarization control system according to an embodiment of the invention.

FIG. 5 illustrates an optical fiber communication system, which employs polarization multiplexing of optical signals. Polarization multiplexing can double the capacity of an optical fiber link by transmitting two data signals with orthogonal polarizations (H and V) along the same optical fiber. However, the birefringence of the fiber produces a rotation of the polarization states such that re-alignment is needed at the receive end in order to recover the two data signals. A feedforward polarization controller of the present invention can be used to perform this re-alignment and also track any fast polarization changes that may occur due to fiber vibration, or other environmental factors.

FIG. 5 shows both the uplink 501 and the downlink 502 of the optical fiber communication system. Each link comprises a polarization beam coupler 503 for multiplexing the two input signals having different polarization states, optical transmission fiber 504 and amplifiers 505, a feedforward polarization controller 506, and a polarization beam splitter 507 for demultiplexing the two input signals having different polarization states. The feedforward polarization controller 506 can be used to ensure that polarization state of the two multiplexed signals is correctly oriented for the polarization demultiplexer 507 to demulitplex and recover the two signals, whilst also tracking any other fast polarization changes.

Figure 6:
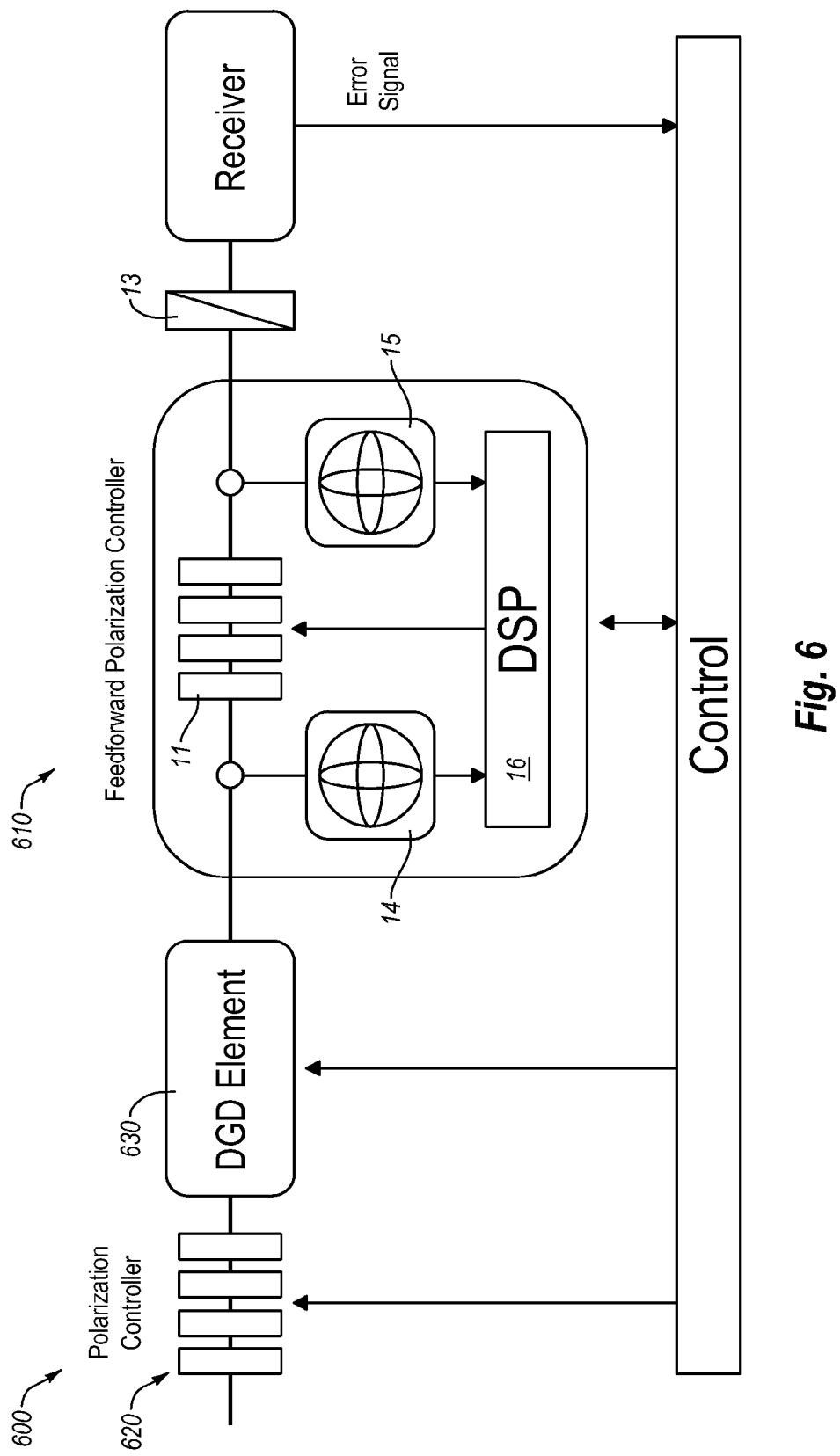
FIG. 6 shows a polarization mode dispersion (PMD) compensator employing a polarization control system according to an embodiment of the invention.

FIG. 6 illustrates an application of the principles described herein in a polarization mode dispersion (PMD) compensator 600. The PMD compensator 600 comprises feedforward polarization controller 610 in accordance with an embodiment of the invention similar to the feedforward polarization controller 10 illustrated in FIG. 1. Parts of the controller 610 which are equivalent to parts of the controller 10 have been given corresponding reference numerals for ease of understanding.

The PMD compensator 600 further comprises a standard polarization controller 620 coupled to a differential group delay (DGD) element 630. The polarization controller 620 is used to align the DGD element 630 such that the first order DGD in the system is compensated. The DGD element 630 may also be tunable in magnitude to further enhance the quality of the compensation. The DGD element 630 is in turn coupled to the feedforward polarization controller 610 which is used to align the output polarization of the controller 610 such that part of the second order DGD is also compensated.

Since the PMD compensator 600 may be positioned in a transmission line that may be several thousands of kilometers long, it is likely that the polarization state impinging on the PMD compensator 600 will vary rapidly with time. This means that a fast polarization control scheme is advantageous in order to ensure that the polarization state impinging on the polarization controller 620 is properly aligned to ensure maximum transmission. This may be achieved through use of the feedforward polarization controller 610 as described in more detail hereinabove.

A further benefit of the feedforward polarization controller 610 is that the first polarimeter 14 in the controller 610 may be used to create a feedback error signal for the polarization controller 620 and the DGD element 630. For example, the first polarimeter 14 may be used to measure the degree of polarization, which is a strong measure of DGD, thus providing a means for compensating for the first order DGD.

Turning now to FIGS. 7 to 10, the results from a numerical simulation of a feedforward polarization controller according to an embodiment of the invention are shown.

Figure 7:
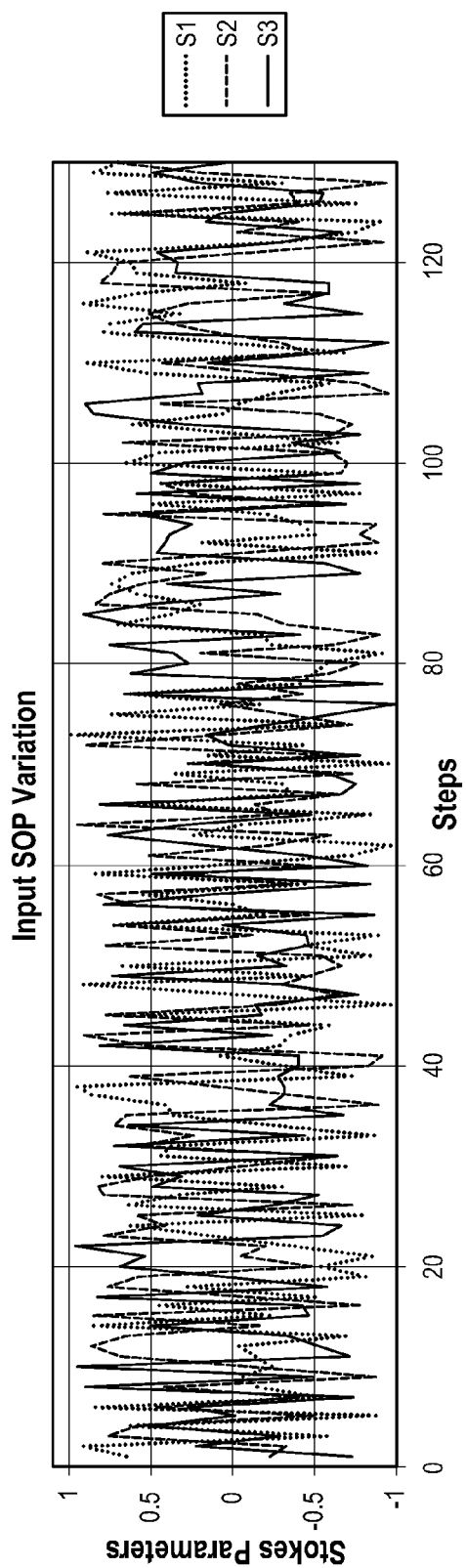
Figure 8:
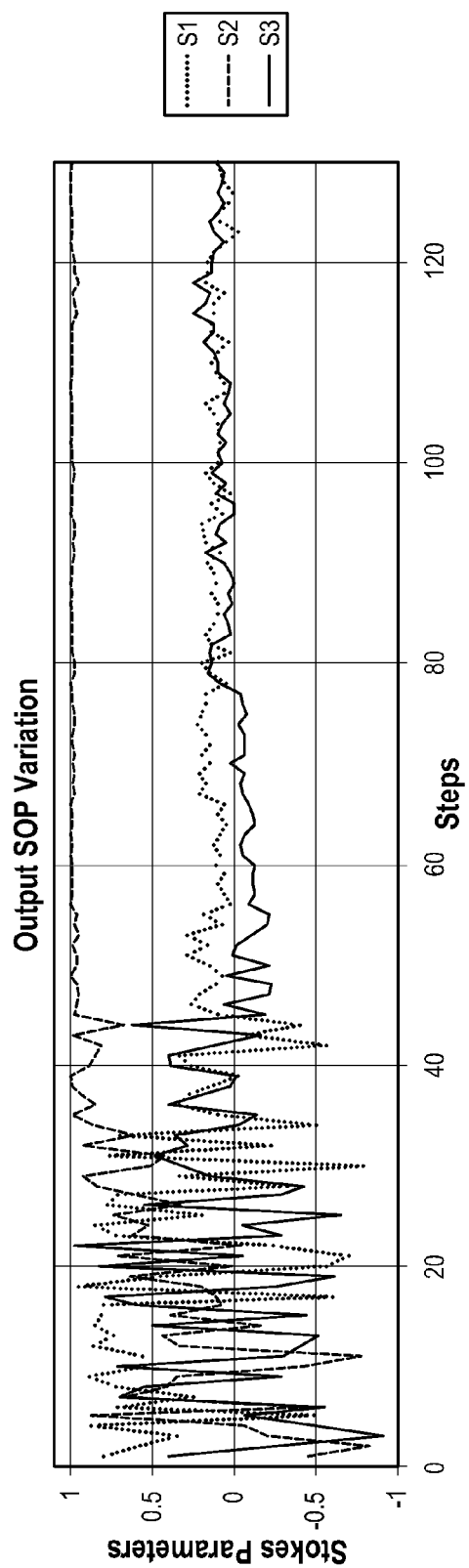

FIGS. 7 and 8 illustrate the variation in the Stokes parameters S1, S2 and S3 during the simulation. The polarization controller and the input and output fiber tails were modeled using the Mueller matrix representation. At each step of the simulation a random input (state of polarization) SOP was launched into the input fiber tail. The SOP was propagated through the input fiber tail, polarization controller and the output fiber tail to arrive at an output SOP. Based on the input and output SOPs and the current estimate of the input and output fiber tail rotation matrices, the polarization controller was set to attempt to achieve an output SOP of $[1,0,0]^T$ using equation (6) above. During the simulation the input and output tail fiber matrices were modified using a Nelder Mead method so as to minimize the difference between the estimated output SOP and the actual output SOP that occurred, in order to solve equation (2). As a result these rotation matrix estimates were refined during the course of the simulation and converged to the correct settings after around 50 steps. FIG. 8 shows how the output SOP progresses through the course of the simulation. Initially the fiber tail rotation matrices are unknown and therefore the output SOP is uncontrolled. After convergence the fiber rotation matrices have been determined to a sufficient degree of accuracy that the output SOP remains reasonably stable despite the still randomly fluctuating input SOP (shown in FIG. 7). It is important to note that once the algorithm has converged the required output SOP is obtained in one iteration by applying equation (6). FIGS. 9 and 10 show the rotation matrix parameters of the input and output fiber tails respectively, demonstrating the convergence to a steady value after about 50 steps.

As will be appreciated by those skilled in art, a feedforward polarization controller of the present invention can be implemented in a variety of ways and can be employed in a range of applications and modes of operation where the monitoring and control of the polarization state of an optical signal is required.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A feedforward controller for controlling the polarization state of an optical signal, the feedforward controller comprising:
    an optical input for receiving an optical input signal having an input polarization state;
    an optical input sampler for sampling the optical input signal to provide one or more signals representative of the input polarization state of the optical input signal;
    an optical output for transmitting an optical output signal having an output polarization state;
    an output sampler sampler for sampling the optical output signal to provide one or more signals representative of the output polarization state of the optical output signal; and
    a polarization controller coupled to the optical input and the optical output;
    a transfer function determiner comprising a signal processor coupled to the optical input sampler and to the optical output sampler, the signal processor determining a characteristic polarization transfer function of the feedforward controller from the input and output polarization states by processing representative signals from the optical input sampler and the optical output sampler, and generating one or more control signals; and
    wherein the polarization controller is adapted to modify the polarization state of light passing therethrough in dependence on the one or more control signals received from the signal processor.

2. A feedforward controller according to claim 1, wherein the signal processor is a digital signal processor and the feedforward controller further comprises:
    a first analog-to-digital converter coupled to the optical input sampler and to the digital signal processor;
    a second analog-to-digital converter coupled to the optical output sampler and to the digital signal processor; and,
    a digital-to-analog converter coupled to the digital signal processor and to the polarization controller.

3. A feedforward controller according to claim 1, wherein at least one of the input and output optical samplers comprises:
    an optical coupler for sampling the input optical signal; and
    a polarimeter coupled to the optical coupler and adapted to provide one or more signals representative of the input polarization state of the input optical signal.

4. A feedforward controller according to claim 3, wherein the optical coupler comprises a tap coupler.

5. A feedforward controller according to claim 3, wherein the polarimeter comprises:
    a resolver for resolving one or more polarization components of the input optical signal; and,
    one or more respective photodiodes for measuring the magnitude of the one or more resolved polarization components.

6. A feedforward controller according to claim 5, wherein the resolver comprises a combination of waveplates and/or polarizer elements.

7. A feedforward controller according to claim 5, wherein the resolver is adapted to resolve at least three polarization components of the optical signal.

8. A feedforward controller according to claim 7, wherein the polarization components define the Stokes vector of the optical signal.

9. A feedforward controller according to claim 1, wherein the polarization controller is adapted to modify the polarization state of light passing therethrough to maintain a polarization state of the optical output signal.

10. A feedforward controller according to claim 1, wherein the polarization controller comprises a plurality of waveplates, each waveplate having an electrically controllable retardance.

11. A feedforward controller according to claim 10, wherein the polarization controller comprises four waveplates having their fast axes oriented at 0, +45, 0, −45 degrees, respectively.

12. A feedforward controller comprising:
    an optical input for receiving an optical input signal having an input polarization state;
    an optical output for transmitting an optical output signal having an output polarization state:
    a transfer function determiner for determining a characteristic polarization transfer function of the feedforward controller from the input and output polarization states, wherein the transfer function determiner comprises a signal processor;
    a polarization controller coupled to the optical input and the optical output, wherein the polarization controller is adapted to modify the polarization state of light passing therethrough in dependence the characteristic polarization transfer function of the feedforward controller
    a polarizing component coupled to the optical output for transmitting light of a predetermined polarization state; and
    a monitor for monitoring at least one of an amount of light transmitted by the polarizing component and an amount of light rejected by the polarizing component and to generate a representative signal therefore,
    wherein the monitor is coupled to the transfer function determiner such that the signal processor processes the representative signal received from the monotir to generate the one or more control signals for the polarization controller, whereby the polarization controller modifies the polarization state of light passing therethrough such that the amount of light transmitted by the polarizing component is maximized and the amount of light rejected by the polarizing component is minimized.

13. A feedforward controller according to claim 12, wherein the polarizing component comprises a polarizing beamsplitter and the monitor comprises a photodiode for monitoring the amount of light rejected by the polarizing beamsplitter.

14. A feedforward controlled optical fiber system comprising:
a first optical fiber transmitting an optical input signal and coupled to an input sampler and to a polarization controller;
a second optical fiber transmitting an optical output signal and coupled to the polarization controller and to an output sampler;
a feedforward controller comprising:
an optical input for receiving the optical input signal having an input polarization state;
an optical output for transmitting the optical output signal having an output polarization state;
the polarization controller coupled to the optical input and the optical output;
a transfer function determiner for determining a characteristic polarization transfer function of the feedforward controller from the input and output polarization states,
wherein the polarization controller is adapted to modify the polarization state of light passing therethrough in dependence on the characteristic polarization transfer function of the feedforward controller,
wherein the transfer function determiner comprises:
the input sampler for sampling the optical input signal to provide one or more signals representative of the polarization state of the optical input signal;
the output sampler for sampling the optical output signal to provide one or more signals representative of the polarization state of the optical output signal, the feedforward controller further comprising a signal processor coupled to the optical input and output samplers and adapted to process the representative signals received therefrom to generate one or more control signals, wherein the polarization controller is adapted to modify the polarization state of light passing therethrough independence on the one or more control signals received from the signal processor.

15. A feedforward controlled system according to claim 14, wherein the first and second optical fibers are optically coupled to the polarization controller by respective fiber tails.

16. A feedforward controlled system according to claim 14, wherein the optical fiber system is part of a polarization multiplexing optical fiber communications system adapted to multiplex two or more optical signals having different polarization states, and wherein the signal processor of the feedforward controller is adapted to generate the one or more control signals for the polarization controller, whereby the polarization controller is adapted to modify the polarization state of light passing therethrough such that the polarization states of the two or more optical signals maintain their orientations.

17. A method for controlling the polarization state of an optical signal comprising the steps of:
receiving an optical input signal at an optical input to an optical system;
an optical input sampler generating one or more signals representative of the input polarization state of the optical input signal;
transmitting the optical input signal through the optical system including through a polarization controller and to an optical output;
an optical output sampler generating one or more signals representative of the output polarization state of an optical output signal represented on the optical output of the optical system;
a signal processor receiving the signals representative of the input polarization state from the optical input sampler;
the signal processor receiving the signals representative of the output polarization state from the optical output sampler;
the signal processor processing the signals representative of the input and output polarization states;
generating one of more control signals resulting from the processing;
modifying the polarization state of light passing through the polarization controller in dependence on the one or more control signals.

18. A method according to claim 17, wherein the steps are performed continuously to drive the polarization controller so as to maintain a polarization state of the optical output signal.

19. A method according to claim 18, wherein the driving of the polarization controller comprises adjusting the optical retardation of a birefringent optical component.

20. A method according to claim 17, wherein the step of generating one or more signals representative of the input polarization state of the optical input signal comprises resolving the optical input signal into one or more components having different polarization and measuring the relative strength of these components.

21. A method according to claim 20, wherein the optical input signal is resolved into at least three different polarization components.

22. A method according to claim 21, wherein the polarization components define the Stokes vector of the optical signal.

23. A method according to claim 17,
wherein the one or more signals representative of the output polarization state of the optical signal represents a magnitude of a polarization component of the optical output signal
wherein the
one or more control signals for driving the polarization controller are configured to maximize or minimize the magnitude of the polarization component of the optical output signal.

24. A method according to claim 17, wherein the polarization controller is driven so as to rotate the polarization state of the output optical signal by a predetermined angle.

25. A method according to claim 17 wherein the step of determining a characteristic polarization transfer function of the optical system comprises the steps of:
accumulating a plurality of pairs of input and output polarization state measurements;
computing the transfer matrices characterising the behavior of unknown components in the system using the accumulated pairs of input and output polarization state measurements and a known transfer matrix of the polarization controller for each pair measurement; and
computing the characteristic polarization transfer function of the optical system required to restore the output polarization to a desired state based on the computed transfer matrices.

* * * * *